(12) United States Patent
Gillespie

(10) Patent No.: US 8,499,779 B2
(45) Date of Patent: Aug. 6, 2013

(54) SYSTEMS, METHODS AND APPARATUS OF A NITINOL VALVE

(75) Inventor: Rebecca A. Gillespie, Pittsburgh, PA (US)

(73) Assignee: The United States of America as represented by the Administrator of the National Aeronautics Space Administration, Washington, DC (US)

(*) Notice: Subject to any disclaimer, the term of this patent is extended or adjusted under 35 U.S.C. 154(b) by 1542 days.

(21) Appl. No.: 12/014,889

(22) Filed: Jan. 16, 2008

(65) Prior Publication Data

US 2013/0167377 A1 Jul. 4, 2013

(51) Int. Cl.
F16K 31/44 (2006.01)

(52) U.S. Cl.
USPC .... 137/15.18; 137/67; 137/68.13; 137/68.11; 251/11

(58) Field of Classification Search
USPC .............. 137/68.11, 68.13, 67, 15.18; 251/11
See application file for complete search history.

(56) References Cited

U.S. PATENT DOCUMENTS

| | | | | |
|---|---|---|---|---|
| 2,997,051 A | * | 8/1961 | Williams | 137/68.13 |
| 3,027,903 A | * | 4/1962 | Thorp, Jr. | 137/68.13 |
| 3,202,162 A | * | 8/1965 | Eckardt et al. | 137/68.13 |
| 3,864,542 A | * | 2/1975 | Fletcher et al. | 219/137 R |
| 3,874,400 A | * | 4/1975 | Groh | 137/68.13 |
| 4,006,780 A | * | 2/1977 | Zehr | 169/26 |
| 4,126,151 A | * | 11/1978 | Bullerdiek | 137/43 |
| 4,421,005 A | * | 12/1983 | Byrne | 89/1.14 |
| 4,579,136 A | * | 4/1986 | Oman et al. | 137/68.13 |
| 4,821,775 A | * | 4/1989 | Cooksey | 137/68.13 |
| 4,973,024 A | * | 11/1990 | Homma | 251/11 |
| 5,119,555 A | * | 6/1992 | Johnson | 29/254 |
| 5,211,371 A | * | 5/1993 | Coffee | 251/11 |
| 5,960,812 A | * | 10/1999 | Johnson | 137/68.14 |
| 6,019,118 A | * | 2/2000 | Voggenreiter et al. | 137/15.18 |
| 6,729,599 B2 | | 5/2004 | Johnson | |
| 6,742,761 B2 | | 6/2004 | Johnson et al. | |
| 6,840,257 B2 | | 1/2005 | Dario et al. | |
| 6,908,467 B2 | * | 6/2005 | Ip et al. | 606/330 |
| 6,926,246 B2 | | 8/2005 | Ginggen | |
| 7,093,817 B2 | | 8/2006 | MacGregor et al. | |
| 7,182,101 B2 | | 2/2007 | Alacqua et al. | |
| 7,192,001 B2 | | 3/2007 | Wise et al. | |
| 7,198,248 B2 | | 4/2007 | Butera et al. | |
| 7,544,257 B2 | * | 6/2009 | Johnson et al. | 148/562 |
| 7,815,161 B2 | * | 10/2010 | Saitoh et al. | 251/11 |
| 7,971,651 B2 | * | 7/2011 | Tanju et al. | 166/373 |
| 2005/0173661 A1 | * | 8/2005 | Mignon et al. | 251/11 |
| 2007/0072147 A1 | * | 3/2007 | Berendt | 433/102 |
| 2007/0088254 A1 | * | 4/2007 | DeStefano | 604/93.01 |
| 2008/0066804 A1 | * | 3/2008 | Rudoy et al. | 137/68.11 |
| 2008/0128027 A1 | * | 6/2008 | Hyde et al. | 137/13 |
| 2008/0251743 A1 | * | 10/2008 | Giovangrossi et al. | 251/11 |
| 2011/0155265 A1 | * | 6/2011 | Kikuchi et al. | 137/468 |

* cited by examiner

Primary Examiner — John Rivell
Assistant Examiner — Minh Le

(57) ABSTRACT

Systems, methods and apparatus are provided through which in some embodiments a non-pyrotechnic valve includes an inlet piece, an actuator comprising a shape-memory metal, and an outlet attached to the inlet piece. In some examples, the shape-memory metal includes Nitinol.

6 Claims, 18 Drawing Sheets

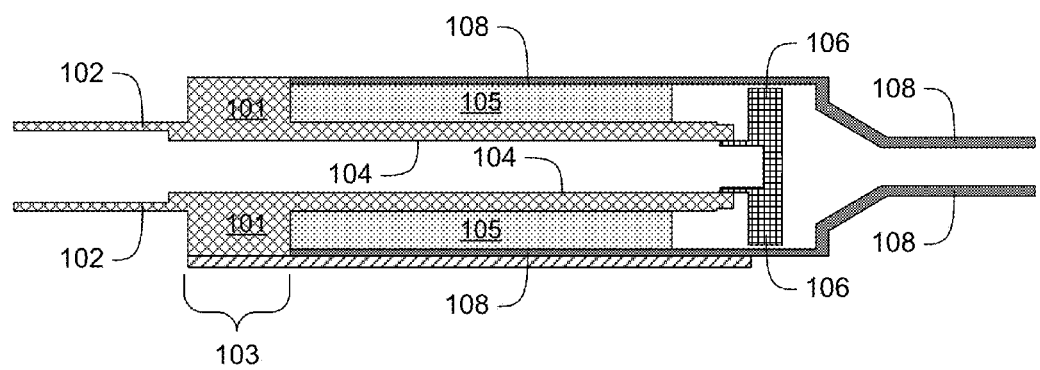

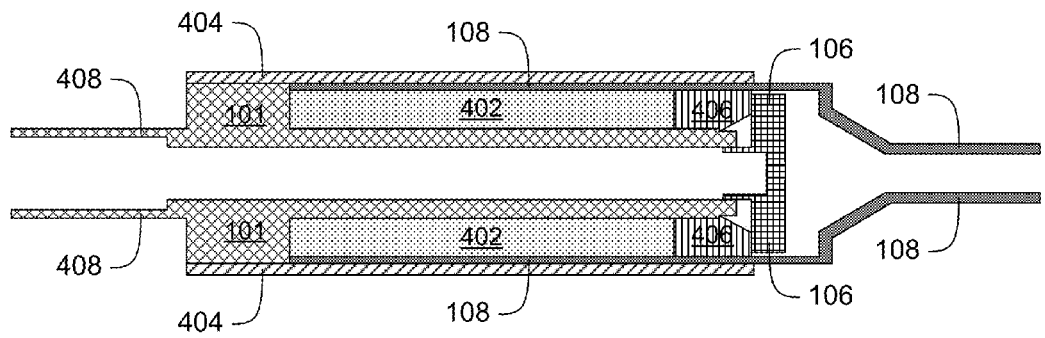
FIG. 4

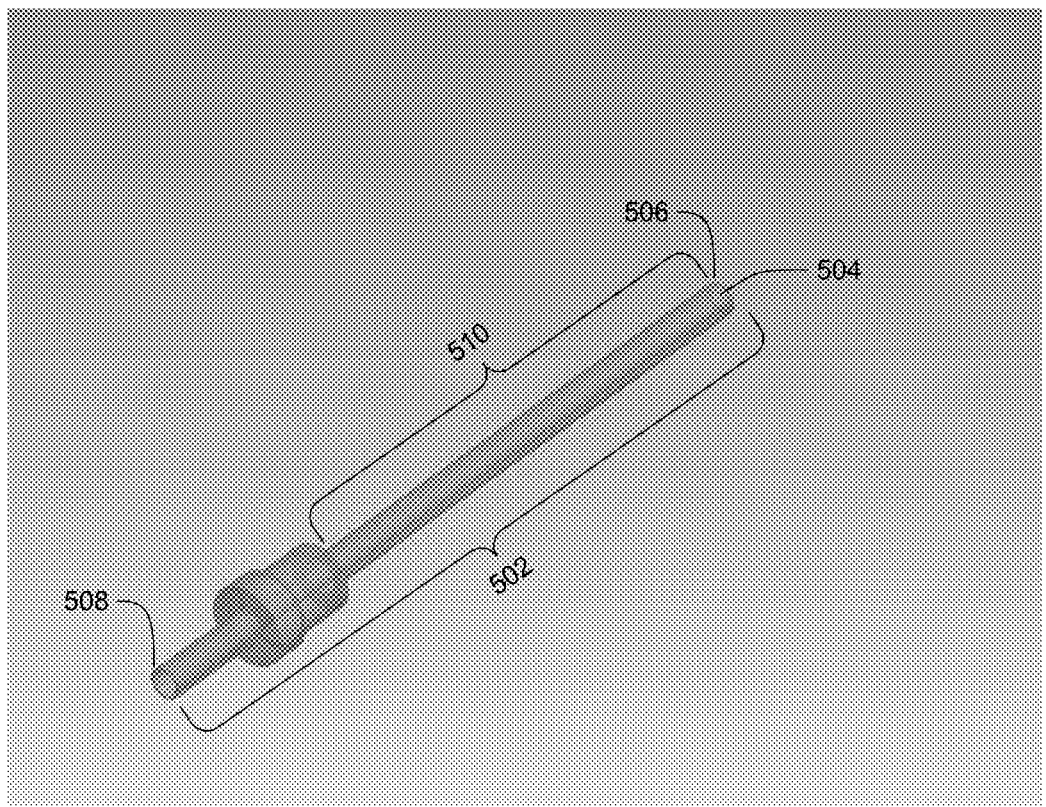
FIG. 5
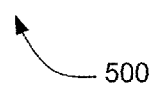
500

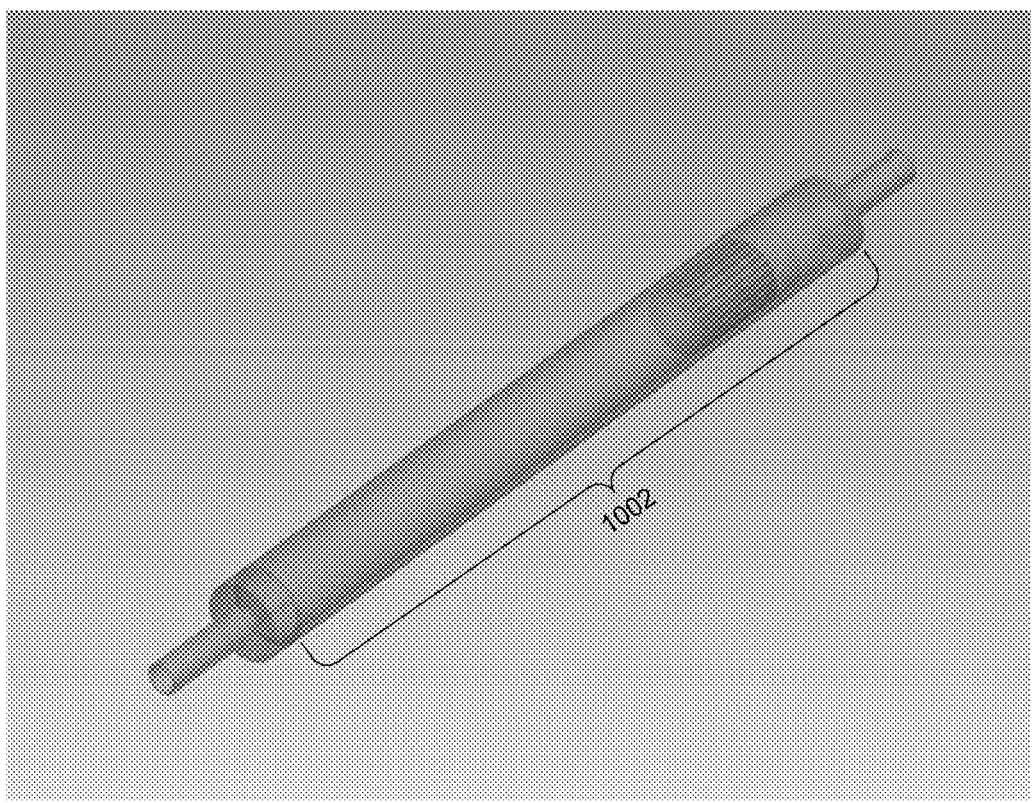

SYSTEMS, METHODS AND APPARATUS OF A NITINOL VALVE

ORIGIN OF THE INVENTION

The invention described herein was made by an employee of the United States Government and may be manufactured and used by or for the Government of the United States of America for governmental purposes without the payment of any royalties thereon or therefore.

FIELD OF THE INVENTION

This invention relates generally to valves, and more particularly to normally-closed propellant or pressurant valves for liquid rocket propulsion systems.

BACKGROUND

Some conventional valves that are normally-closed zero-leak and one time actuating are known as pyrovalves. A pyrovalve includes a shear section that opens a valve. A section of pipe is machined with a slug blocking the flow path so that the valve is normally-closed. The valve body has a bore. A ram is disposed inside the bore of the valve body. An explosion or pressure caused by the explosion on top of the ram forces the ram downward and causes reduced thickness sections to fracture and translate a slug out of the flow path and into a side chamber. The ram is propelled downward by an explosive means. The bore guides the ram and also becomes the expanding combustion chamber as the ram moves downward.

A combustion chamber is disposed in operative relation to the ram such that when an explosive material is ignited the pressure inside the chamber causes the ram to move through the bore to strike the slug and to displace the slug from the opening such that the valve is opened.

There is a need in the art for systems, methods, and apparatus of a pyrovalve to isolate the high pressure tanks during a dynamic launch environment so that the pressure cannot leak through the conventional soft seat valves or spring actuated regulator and over-pressurize the propellant tanks.

SUMMARY

In one aspect, a valve includes an actuator made of shape-memory metal and a parent metal seal that is coupled to the actuator and prevents flow from the inlet to the outlet. The seal has a break section that is broken by the actuator. The valve is a zero-leak valve that will not leak before actuation due to the parent metal seal. After the seal is broken there can be flow between the previously isolated inlet and outlet. Alternatively, the valve can have a non-parent metal seal that provides for a leak rate less than $10^{-6}$ scch where either the ball or the seat is coupled to the shape memory actuator.

In another aspect the working fluid present at either an inlet, an outlet or both is separated from the outside of the valve by a closed welded path before, during and after valve actuation.

In yet another aspect, a normally-closed non-pyrotechnic valve includes an actuator constrained by a cap which blocks flow between the inlet and the outlet through a break section. The actuator comprising a material that will increase in length by at least 5% upon absorption of significant heat, will open the valve by breaking the break section and allowing a flow to pass from the inlet tube to an outlet tube.

In yet a further aspect, a method to fabricate a valve includes sliding an actuator over a first portion of a metallic inlet piece the actuator comprising a shape-memory metal, wherein the method also includes attaching a flow passage piece to the end of the first portion of the metallic inlet piece. In some embodiments, a filler piece of titanium can be used in compression to transfer the force from the expanding actuator to the flow passage cap. In some embodiments, an outlet piece, having an inside diameter roughly equal to the outside diameter of the actuator, is welded outside the actuator to completely enclose the valve.

In each embodiment described herein, an "inlet" can function as an "outlet" and an "outlet" can function as an "inlet." Apparatus that are described an as "inlet" are the portion that can conventionally be the portion having a higher pressure that the "outlet" during operation, but every application does not necessarily have a higher pressure on the portion described as the "inlet;" in some embodiments or applications, the portion described as the "outlet" has a higher pressure than the "inlet" in which case flow moves from the "outlet" and out through the "inlet."

Apparatus, systems, and methods of varying scope are described herein. In addition to the aspects and advantages described in this summary, further aspects and advantages will become apparent by reference to the drawings and by reading the detailed description that follows.

BRIEF DESCRIPTION OF THE DRAWINGS

FIG. 4 is a cross-section block diagram of a valve having a heater and having a filler, according to an embodiment;

FIG. 5 is an isometric diagram of an inlet piece of a normally-closed valve;

DETAILED DESCRIPTION

In the following detailed description, reference is made to the accompanying drawings that form a part hereof, and in which is shown by way of illustration specific embodiments which can be practiced. These embodiments are described in sufficient detail to enable those skilled in the art to practice the embodiments, and it is to be understood that other embodiments can be utilized and that logical, mechanical, electrical, and other changes can be made without departing from the scope of the embodiments. The following detailed description is, therefore, not to be taken in a limiting sense.

The detailed description is divided into four sections. In the first section, a system level overview is described. In the second section, apparatus of embodiments are described. In the third section, methods of embodiments are described. Finally, in the fourth section, a conclusion of the detailed description is provided.

System Level Overview

Figure 1:
FIG. 1 is a cross-section block diagram of an overview of a valve, according to an embodiment.

FIG. 1 is a cross-section block diagram of an overview of a valve 100, according to an embodiment.

Valve 100 includes an inlet piece 101, which includes an inlet tube 102, a section 103 for welding to an outlet piece (collar) 108 and an inner tube 104 which allows flow through the center of the actuator towards a flow passage cap. Before operation of the valve 100, gas or liquid is received into the inlet piece 101. In some embodiments, the inlet piece 101 is a tube having a ¼" diameter. One embodiment the inlet piece 101 is inlet piece 502 in FIG. 5 below.

Figure 2:
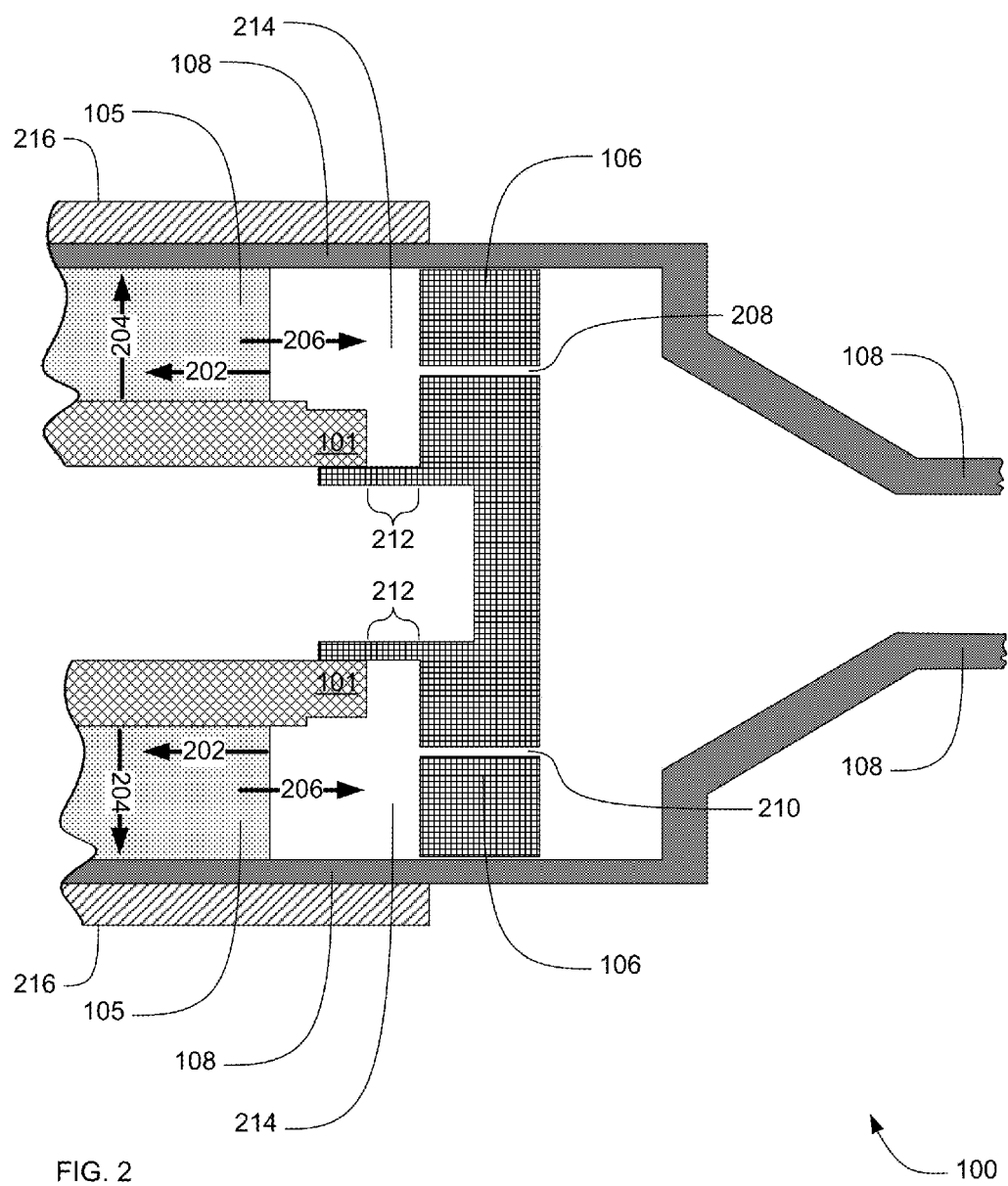
FIG. 2 is a cross-section block diagram of section of an apparatus of a normally-closed valve while closed, according to an embodiment.

Valve 100 also includes a flow passage piece 106 which is comprised of a small section of the inner tube (with the same diameter and wall thickness as the inner tube on the inlet piece), a break section, which has a smaller cross sectional area than the inner tube and the flow passage cap. The flow passage cap has holes which will allow flow to pass, as shown in FIG. 2 below. The flow passage piece 106 is welded to the inlet piece 101 at the inner tube 104, underneath a filler (not shown in valve 100).

Valve 100 also includes an actuator 105. In FIG. 1, the actuator 105 is shown surrounding, the inner tube and break section. The actuator 105 includes a material that will increase in length upon absorption of energy, such as a shape-memory metal or shape-memory polymer. A shape-memory metal is a metal that "remembers" its geometry with great force. After a portion of shape-memory metal has been deformed from an original crystallographic configuration, the portion regains the original geometry without an external mechanical force during heating to a particular temperature range. In some embodiments, the shape-memory metal of the actuator 105 is one-way shape-memory metal. In some embodiments, the shape-memory metal of the actuator 105 is two-way shape-memory metal. In some embodiments, the shape-memory metal of the actuator 105 is a combination of one-way and two-way shape-memory metal. The three main types of shape-memory metal are copper-zinc-aluminum-nickel, copper-aluminum-nickel, and nickel-titanium (NiTi) alloys. The NiTi alloys are discussed below in reference to FIG. 4. The valve will produce no pyroshock when actuated and will only produce small amounts of mechanical shock.

In some embodiments, the actuator 105 will increase in length by about 5% after absorption of heat. The expansion of the actuator 105 is constrained, providing a reaction which leads to tension in the inner tube 104 and the break section The valve 100 also includes an outlet piece 108 that is comprised of an outer tube section, that surrounds the actuator 105, a reducer and an outlet tube. In some embodiments, the outlet tube 108 is a tube having a ¼" diameter. These pieces create the closed welded path for the outlet, which in valve 100 is the side containing the actuator as well.

While the valve 100 is not limited to any particular inlet piece 101, actuator 105, flow passage piece 106 and outlet piece 108, for sake of clarity the inlet piece 101, actuator 105, flow passage piece 106 and outlet piece 108 have been described. The functional sections can be combined differently to form a functionally equivalent valve using different pieces.

In some embodiments, the valve 100 holds pressures of up to 5000 per square inch (psi). In some embodiments the flow through the inner tube 104, through the gap after the break and through the holes in the flow passage cap will lead to less than 1 psid pressure drop at 1 scfm Helium.

Some embodiments of the functional sections of valve 100 include the inlet tube 102, which connects to the rest of the propulsion system, the inner tube 104 which runs though the center of the Nitinol actuator 105 and connects to the inlet tube 102 but has a larger cross sectional area than the inlet tube 104, a break section (212 in FIG. 2 below) which is a tube section with a smaller cross sectional area than the inner tube 104 and connects to the inner tube 104 and the flow passage cap. The flow passage cap forms a parent metal seal with the break section 212 containing the upstream fluid.

Other embodiments using a parent metal seal will also have a break section 212 and a flow passage cap. The flow passage cap closes off the valve before actuation and allows flow after actuation in some embodiments, however in some embodiments, such as in valve 100, the flow passage cap includes holes. In other embodiments the holes that allow flow passage are in an element (e.g., stop guide 1506 in FIG. 15) that stops the flow passage cap at the end of the stroke or movement away from the inner tube 104. In other embodiments, no holes are needed and the outlet flow path does not go around the flow passage cap at all.

Valve 100 can be used in liquid chemical in-space propulsion systems to isolate sections of the system during launch. The dynamic launch environment causes spring actuated regulators and soft seat valves (such as check valves and latch valves) to leak. Normally closed valves can be used to isolate the high pressure tanks from the propellant tanks. Also, normally closed valves can be used to isolate the fuel lines from the oxidizer lines in hypergolic systems with a common pressurant line.

One application of the valve 100 is in-space propulsion systems. However, valve 100 can be implemented in applications beyond in-space propulsion systems, such as mining safety equipment, pipeline safety equipment, fire safety, or nuclear reactor safety, and applications with hazardous working materials and conditions. These applications require an improved valve that is provided by the valve 100. The systems, methods and apparatus described herein are amenable to miniaturization, ruggedization, and integration with other instrument components.

APPARATUS OF AN EMBODIMENT

In the previous section, a system level overview of the operation of an embodiment was described. In this section, an exemplary apparatus of embodiments are described by reference to a series of diagrams.

FIG. 2 is a cross-section block diagram of section of an apparatus of a normally-closed valve 100 while closed, according to an embodiment.

Axial expansion of the actuator 105 is constrained in a direction 202 toward inlet tube 101 and also in a direction 206 toward the flow passage piece 106. The outward axial force 202 from the actuator 105 creates a tensile force in the inner tube 104 and a break section 212. The expansion of the actuator 105 will eventually break the break section and expand in a direction 206 toward the flow passage piece 106.

In some embodiments, the flow passage cap 106 is moved into a position wherein a passageway between the inlet 101 and the outlet 108 is opened when the break section 212 is broken or severed. In some embodiments, the break section is a weak portion of the flow passage piece 106. The break section 212 is broken or severed to an extent that the flow passage cap 106 moves in the direction 206 that the gas or fluid on the inlet side 101 is able to pass to space 214 and then through the at least one hole (208 and/or 210), into the second tube 108 and then out of the valve 100. The break section 212 is substantially weaker than the remainder of the inner tube 104.

The force from the shape-metal alloy of the actuator 105 is sufficient to reach the ultimate tensile strength (UTS) of the break section 212. During expansion of the actuator 105, the actuator 105 expands in the direction 206 towards the flow passage piece 106. The amount of force of the expansion of the actuator 105 is reasonably calculated in regards to the amount of expansion stimuli (e.g., heat and/or electric current), the original strain imparted to the material, the strain at which the force is measured (i.e., the length at which the maximum force is required), a property of the material of the actuator 105, and the cross-sectional area of the actuator 105.

A heating mechanism 216 can be electrical (e.g., resistive), or the heating mechanism 216 can be chemical via combustion or other exothermic processes.

The force required to actuate the valve is reasonably calculated in regards to the cross-sectional area of the break section 212, the ultimate tensile strength of the break section material, and the static and dynamic friction between the actuator 105 and the outer tube 108.

The strain required to actuate the valve is reasonably calculated in regards to the length of the break section 212 multiplied by the elongation at breaking point percentage of the break section material, plus the required gap through which the flow will pass after the break, plus any errors or gaps originally existing between the shape-memory allow (SMA) and the edges that constrain the SMA, and plus the strain in the inner tube 104 (or any other section of tube) that results from the tension.

The length change of the shape-metal alloy actuator is reasonable calculated in regards to the initially imparted strain, the permanent deformation from the initially imparted strain and a property of the SMA which determines the percent recovery as a function of the two aforementioned properties.

Figure 3:
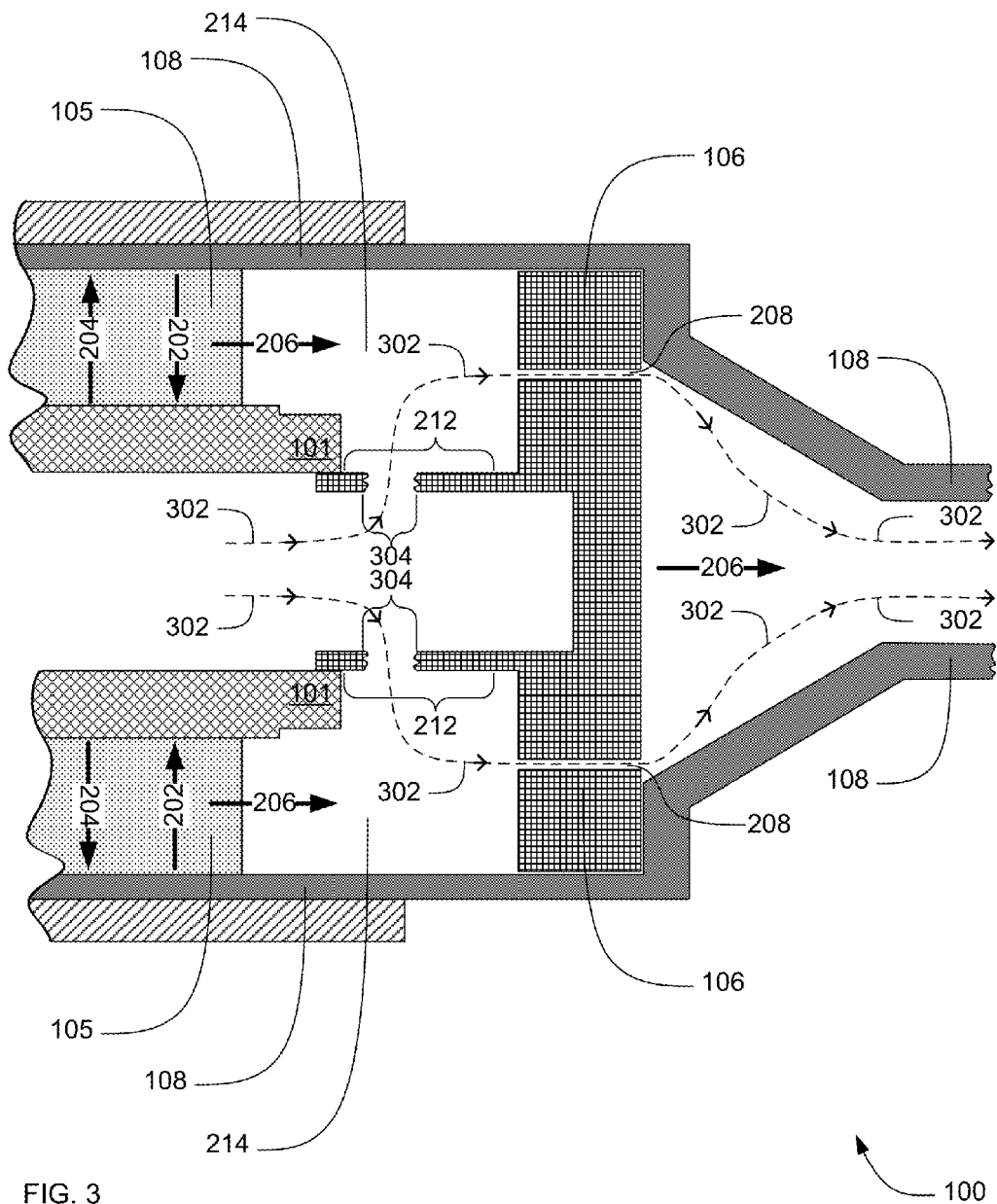
FIG. 3 is a cross-section block diagram of section of an apparatus of a normally-closed valve while open, according to an embodiment.

The flow passage cap 106 can include holes, such as the six holes in 106, shown on the schematic as holes 208 and 210. Each of the hole(s) 208 pass through the flow passage piece 106. The at least one hole becomes part of the passageway between the inlet 101 and the outlet 108 when the flow passage piece 106 has been moved into a position wherein a passageway between the inlet piece 101 and the second tube 108 is opened, as shown in FIG. 3 below. The flow can pass around the flow passage piece, the flow can pass out of the valve along a different axis than the flow entered or the flow passage piece can be moved out of the flow path all together with springs or magnets or otherwise. See FIGS. 11-14 below for examples of SMA-actuated valves in which a flow piece does not include holes.

FIG. 3 is a cross-section block diagram of section of an apparatus of a normally-closed valve 100 while open, according to an embodiment.

In FIG. 3, the flow passage piece 106 is moved into a position wherein a passageway 302 between the inlet piece 101 and the second tube 108 is opened after the break section 212 (e.g., portion of the flow passage piece 106 with a smaller cross-sectional area than the remainder of the flow contains gas at a higher pressure than gas in the second tube 108 (wherein the inlet piece 101 acts as a inlet piece and the second tube 108 acts as an outlet tube), after the break section 212 is broken 304 to an extent that the flow passage piece 106 moves in the direction 206 toward the inlet piece 101, the gas or liquid is able to pass into the space 214, and thereafter the gas or liquid is able to pass through the art least one hole (208 and/or 210), into the second tube 108 and then out of the valve 100.

Figure 15:
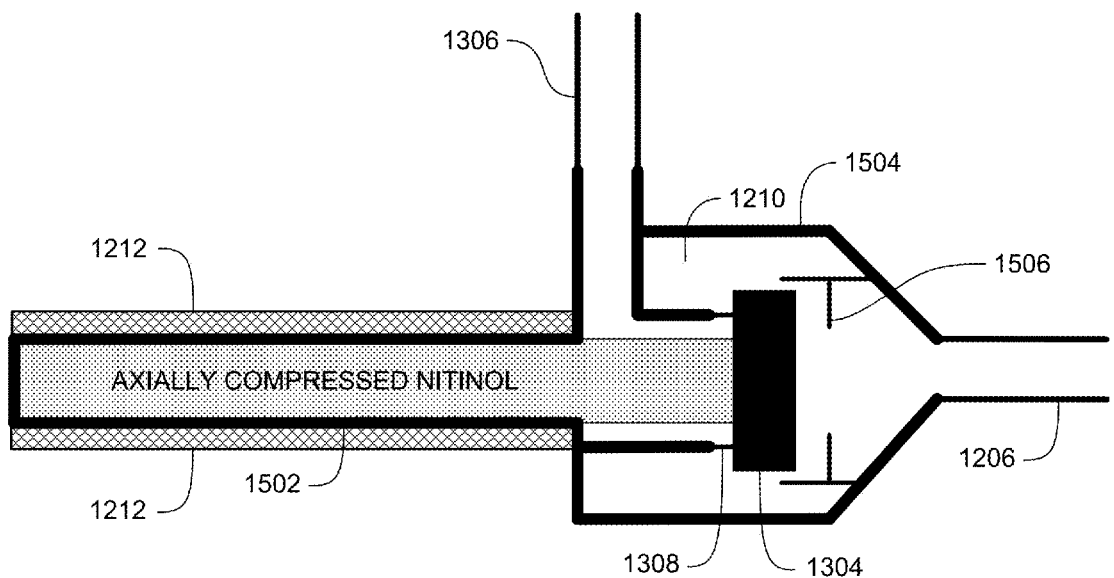
FIG. 15 is a block diagram of a normally-closed valve assembly having a bend in the flow path and having a cap coupled to axially compressed actuator, according to an embodiment.

In some embodiments, such as shown in FIG. 15 below, the valve 100 is a 90 degree bend valve, where the broken section is pushed against a stop and flow passes straight into an outlet tube without passing through the "through holes." In other embodiments, the flow can pass around the flow passage piece provided the diameter into which the flow is passing is larger, or the flow passage piece is moved out of the way. Furthermore, the Nitinol can be welded directly to the inlet tube and the outlet tubes on a linear valve, similar to valve 100 thereby eliminating the need for an outer tube and improving the heat transfer to the Nitinol. However, if Nitinol is welded to the inlet tube and outlet tube the entire valve will change size upon actuation and fabricating the valve will be more complicated.

FIG. 4 is a cross-section block diagram of a valve 400 without a filler. This example has all the same pieces as valve 100, less the filler titanium. The first weld would have to be located at a different location. Many different embodiments of valve 100 are possible where the welds are in different locations and the pieces contain different sections of the valve.

To make a shape memory alloy actuator, first the appropriate alloy is selected for the desired transition temperature. Set the parent shape by holding the piece in position and heating to about 500° C. (varies by alloy). The atoms arrange themselves into a cubic, highly symmetrical arrangement known as the austenite phase. After the piece has cooled down, the piece will enter the martensite phase and can be deformed into various shapes. When the piece is heated back up to the austenite phase (a transition temperature that varies with alloy but never exceeds about 100° C. for Nitinol) the piece will "remember" the parent shape and exert a great force to return to that shape if the piece is in anyway constrained from returning. All of these phase changes occur while the Nitinol remains a solid, only the crystal structure changes as described.

Nitinol is typically composed of approximately 55% nickel and 45% titanium by weight. Making small changes in the composition can change the transition temperature of the alloy significantly. For this reason, the actuation temperature can be tailored for the application. In propulsion systems, the high transition temperature is used to trigger the expansion of the Nitinol actuator 402.

All versions of the Nitinol valves also include at least one heater 404, or other heat generating device or chemical to provide heat to prompt the shape-memory alloy in the actuator 105 to return to the original shape of the shape-memory alloy. The heater 404 is positioned in a location from which heat generated by the heater 404 will be conducted to the actuator 105 or 402. In some embodiments, the heater 404 generates 60 watts of heat. In some embodiments, that heater 404 is outside of the closed welded path in which the inlet and outlet are contained.

In embodiments not shown in which the actuator 105 includes a ferromagnetic shape-memory alloy, the ferromagnetic shape-memory alloy regains original geometry upon absorption of magnetic energy, and the valve includes a magnetic field generator.

Some embodiments of the value 100 include at least one filler 406 that occupies the entire longitudinal distance between the actuator and the flow passage piece 106, so that when the actuator begins expansion, a force will be exerted immediately upon the flow passage piece 106. The filler is needed if the valve is assembled with an orbital weld along the inner tube.

As an alternative to filler 406, halves of Nitinol are placed onto the valve 400, surrounding the inner tube after the first weld has been performed. In this way, no filler is needed because the Nitinol can be added after the weld. In another alternative, the weld is performed elsewhere, such as embodiment of the value 400. In reality, the location of the interface between these pieces with respect to the functional parts is variable. For instance, the inlet tube, the inner tube, the break section and the flow passage cap can be a single piece. In that instance, the weld section of the current configuration can be a cylinder with a corner to weld to the outlet piece. The cylinder would be fillet welded to the inner tube after the Nitinol has been slid over the inner tube. The outlet piece would be welded on in the same way as before.

In some embodiments of valve 100 and valve 400, an inlet piece, outlet piece and flow passage piece 408 include only Titanium.

FIGS. 5 through 10 show one possible assembly procedure for valve 100.

FIG. 5 is an isometric diagram of an inlet piece of a normally-closed valve assembly 500, according to an embodiment. The normally-closed valve assembly 500 includes an inlet piece 502. The inlet piece 502 has an open passageway 504 that extends from one end 506 of the inlet piece 502 to the other end 508 of the inlet piece 502. The passageway 504 permits passage of fluid(s)/and gas(es) from one end 506 of the inlet piece 502 to the other end 508 of the inlet piece 502. The inlet piece 502 includes a first portion 510 having first circumference or diameter. In some embodiments, the inlet piece 502 includes metal such as Titanium, or is wholly fabricated from the metal.

Figure 6:
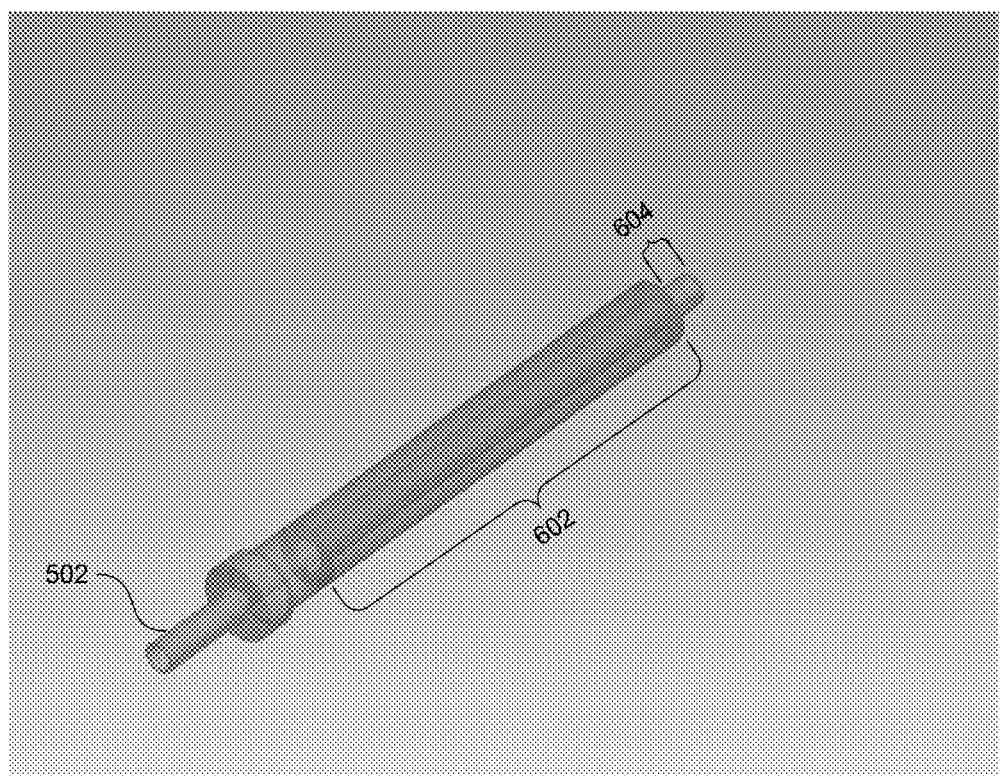
FIG. 6 is an isometric diagram of a Nitinol actuator rod mated with an inlet piece of a normally-closed valve assembly, according to an embodiment.

FIG. 6 is an isometric diagram of a Nitinol actuator rod mated with an inlet piece of a normally-closed valve assembly 500, according to an embodiment. The normally-closed valve assembly 500 includes a Nitinol actuator rod 602 that is mated with an inlet piece 502. In some embodiments, the Nitinol actuator rod 602 is slid over a first portion (first portion 510 in FIG. 5) of the inlet piece 502, in which the first portion 510 of the inlet piece 502 has an outer proportion, circumference or diameter that is about equal to an inner proportion of an inside of the Nitinol actuator rod 602. In some embodiments, the longitudinal length of the Nitinol actuator rod 602 is less than the longitudinal length of the first portion 510 of the inlet piece 502 to the extent that an end 604 of the first portion 510 of the inlet piece 502 extends beyond the Nitinol actuator rod 602. In other embodiments the Nitinol rod would be in halves or pieces which do not surround the inner tube and occupy the entire length from the collar on the inlet piece to the flow passage piece (i.e., no filler required).

Figure 7:
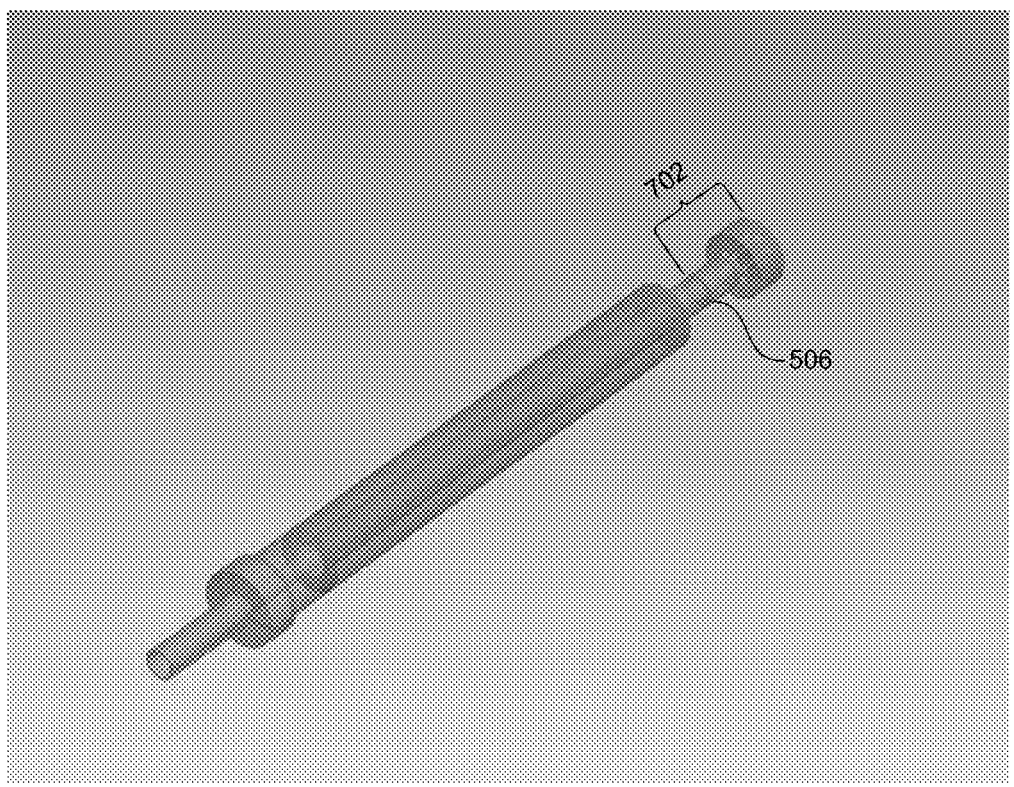
FIG. 7 is an isometric diagram of a flow passage piece welded to an inlet piece of a normally-closed valve assembly, according to an embodiment.

FIG. 7 is an isometric diagram of a flow passage piece welded to an inlet piece of a normally-closed valve 500 assembly, according to an embodiment. In FIG. 700, a flow passage piece 702 is attached to the end 506 of the first portion 510 of the inlet piece 502. In some embodiments, the attaching is performed by orbital welding of a metallic flow passage piece 702 to a metallic end 506 of the first portion 510 of the inlet piece 502.

Figure 8:
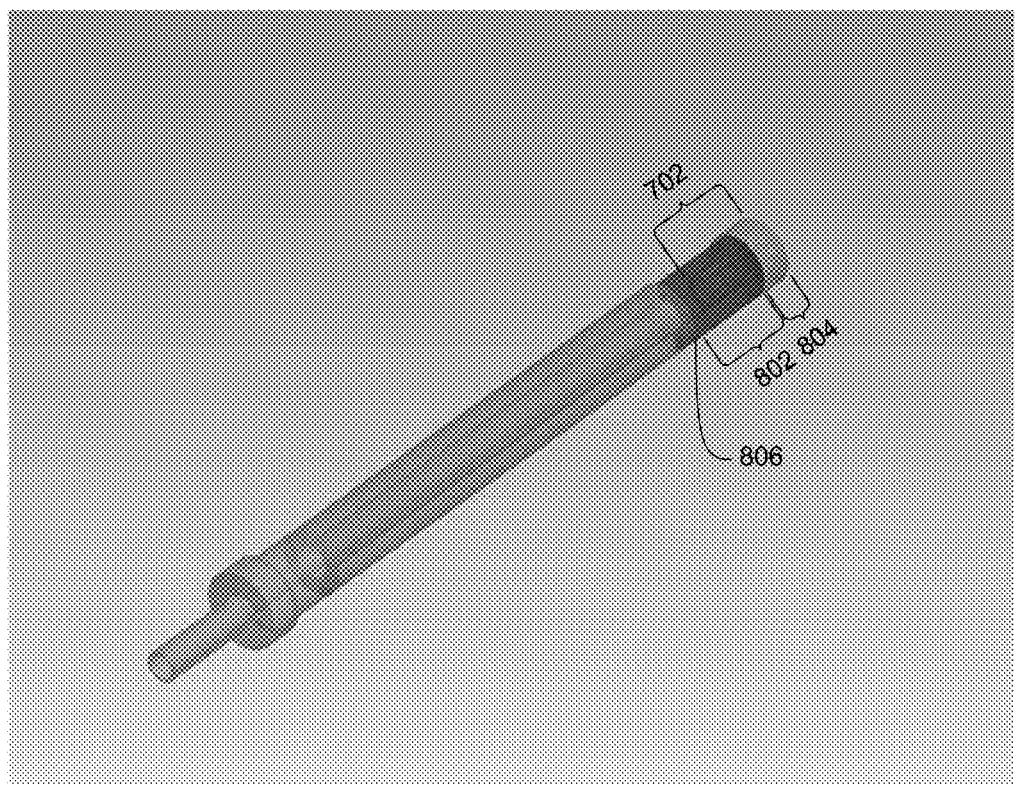
FIG. 8 is an isometric diagram of a filler-half mated to a normally-closed valve assembly, according to an embodiment.

FIG. 8 is an isometric diagram of a filler-half mated to a normally-closed valve 500 assembly, according to an embodiment. In FIG. 8, a filler-half 802 is placed between an end-flange 804 of the flow passage piece 702 and an end 806 of the Nitinol actuator rod. The end-flange 804 is a portion of the flow passage piece 702 that is wider than the outer proportion of the inlet piece 101.

Figure 9:
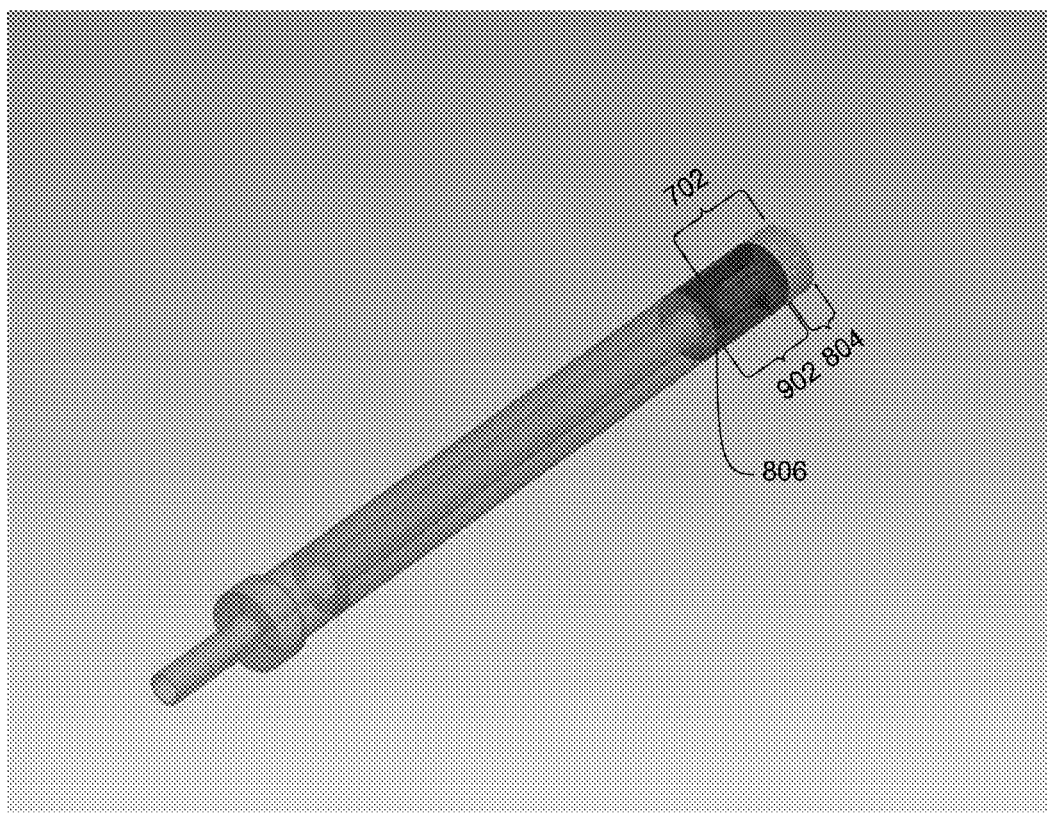
FIG. 9 is an isometric diagram of a filler-half mated to a normally-closed valve assembly, according to an embodiment.

FIG. 9 is an isometric diagram of a filler-half mated to a normally-closed valve 500 assembly, according to an embodiment. In FIG. 9, a filler-half 902 is placed between the end-flange 804 of the flow passage piece 702 and the end 806 of the Nitinol actuator rod. In some embodiments, a filler includes two filler halves, such as filler-half 802 and filler-half 902. However, other embodiments of the filler include a singular filler, three fillers, four fillers, or other multiples of fillers. In some embodiments, the filler(s) includes metal such as Titanium, or is wholly fabricated from the metal. In some embodiments of metallic filler(s), the filler(s) are welded to a metallic inlet piece and/or welded to a metallic flow passage piece.

Figure 10:
FIG. 10 is an isometric diagram of outlet piece welded to a normally-closed valve assembly, according to an embodiment.

FIG. 10 is an isometric diagram of outlet piece welded to a normally-closed valve 500 assembly, according to an embodiment. In FIG. 10, an outlet piece 1002 is mounted over the inlet piece 502. In particular, the outlet piece 1002 is mounted over a portion of the inlet piece 502 that has a longitudinal length that is greater than the longitudinal length of the first portion of the metallic inlet piece. This will allow an orbital weld to be performed without actuating the Nitinol. In some embodiments, the inside diameter of the outlet piece 1002 is about the same as the outer diameter of the Nitinol actuator rod 602, because having a snug fit between the outlet piece 1002 and the Nitinol actuator rod 602 improves the heat transfer from outside the valve to the Nitinol actuator rod 602.

Figure 11:
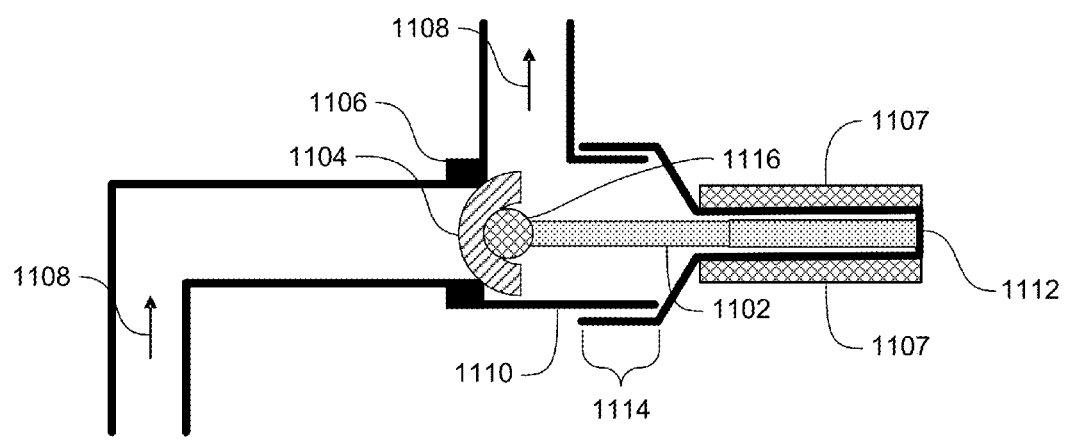
FIG. 11 is a block diagram of a normally-closed valve assembly having a bend in the flow path and having a Nitinol actuator in the flow path before a flow passage piece, according to an embodiment.
Figure 11:

FIG. 11 is a block diagram of a normally-closed valve assembly 1100 having a bend in the flow path and having a Nitinol actuator in the flow path before a flow passage piece, according to an embodiment. In FIG. 11, a Nitinol or other shape-memory metal actuator 1102 is deformed by axial compression, thus holding a seal 1104 against a seat 1106. When the Nitinol or shape-memory metal is heated by heater 1107 above the transformation temperature, the actuator 1102 returns to its original shape, and allows flow 1108 in either direction, such as flow 1108.

In some embodiments, the body of valve assembly 1100 includes at least two portions, a first portion 1110 and a second portion 1112. The first portion 1110 and the second portion 1112 overlay in a section 1114, wherein the first portion 1110 and the second portion 1112 are coupled, attached, or welded together. In some embodiments, the first portion 1110 and the second portion 1112 are threaded, and when assembled, the two portions 1110 and 1112 are screwed together along the overlaid section 1114 and tightened to a particular amount of torque to create a tight near-zero-leak ball/seat seal. Furthermore, in some further embodiments, the first portion 1110 and a second portion 1112 and the second portion are further welded along the overlaid section 1114 to completely enclose the working fluid in a closed welded path.

In some embodiments, the actuator 1102 and the seal 1104 are coupled through a sphere 1116, and in some further embodiments, the coupled includes a threaded coupling.

Figure 12:
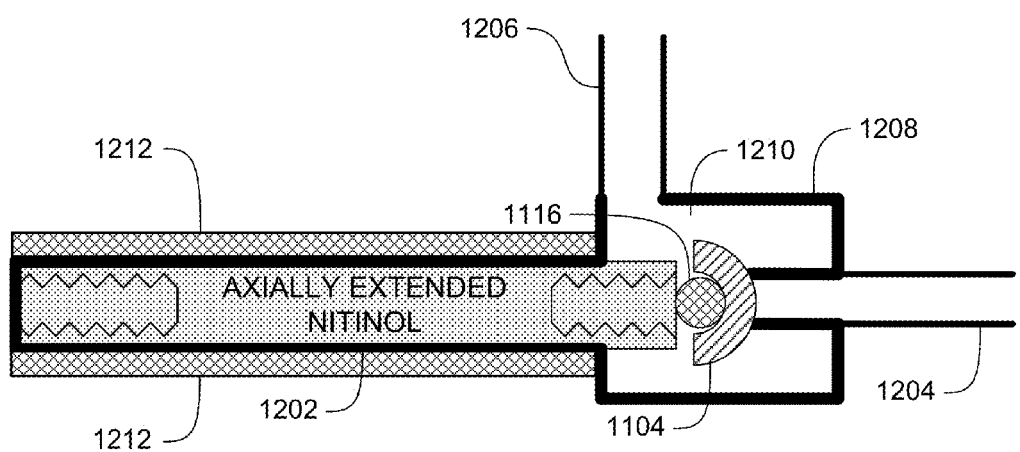
FIG. 12 is a block diagram of a normally-closed valve assembly having a bend in the flow path and having a seat coupled to an axially extended actuator, according to an embodiment.

FIG. 12 is a block diagram of a normally-closed valve assembly 1200 having a bend in the flow path and having a seat coupled to an axially extended actuator, according to an embodiment. The normally-closed valve assembly 1200 includes a Nitinol actuator 1202, or an actuator having another shape-memory metal. The Nitinol actuator 1202 is extended along a longitudinal axis.

The normally-closed valve assembly 1200 also includes a sphere 1116 that is attached to the Nitinol actuator 1202, and a seat 1104 that is coined to fit the sphere 1116. The normally-closed valve assembly 1200 does not have a parent metal seal, or a break section, but can achieve pyrovalve-like requirements through large seating forces imparted during manufacturing. These forces can be imparted, as in valve 1100 through a threaded coupling that is later welded. The normally-closed valve assembly 1200 also includes an inlet piece 1204. The normally-closed valve assembly 1200 also includes a second tube 1206 that is open to a housing 1208 that forms a chamber 1210. The Nitinol actuator 1202 is in thermal contact with a heater 1212, for example, the Nitinol actuator 1202 is surrounded and in direct contact with the heater 1212.

When the Nitinol actuator 1202 is heated by heater 1212 above the transformation temperature of the Nitinol, the actuator 1202 will shrink lengthwise and thereby return to its original shape, moving the sphere 1116 and the seat 1104 away from the inlet piece 1204, and thus allowing flow of fluid or gas through either the inlet piece 1204 or the second tube 1206, into the chamber 1210 and out the chamber 1210 through the other tube. The flow will occur from the tube that has a higher pressure of contents than the other tube.

Figure 13:
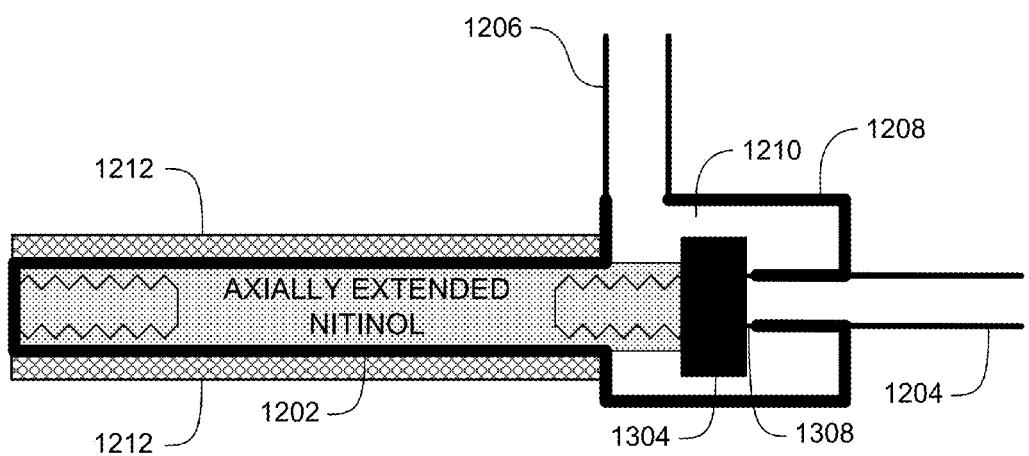
FIG. 13 is a block diagram of a normally-closed valve assembly having a bend in the flow path and having a cap coupled to an axially extended actuator, according to an embodiment.

FIG. 13 is a block diagram of a normally-closed valve assembly 1300 having a bend in the flow path and having a cap coupled to an axially extended actuator, according to an embodiment. The normally-closed valve assembly 1300 includes a Nitinol actuator 1202, or an actuator having another shape-memory metal. The Nitinol actuator 1202 is extended along a longitudinal axis. In some embodiments, the Nitinol is stretched lengthwise.

The normally-closed valve assembly 1300 also includes a cap 1304 that creates a parent metal seal. The cap 1304 is attached to the Nitinol actuator 1202. The normally-closed valve assembly 1300 also includes an inlet piece 1204 that is attached to the cap 1304 via a break section 1308. The normally-closed valve assembly 1300 also includes a second tube 1206 that is open to a housing 1208 that forms a chamber 1210. The Nitinol actuator 1202 is in thermal contact with a heater through the titanium outlet tube, 108. Therefore, the Nitinol must be kept in contact with the inside of the tube and the heater must be in contact with the outside of the tube.

When the Nitinol actuator 1202 is heated by heater 1212 above the transformation temperature of the Nitinol, the actuator 1202 will shrink lengthwise and thereby return to its original shape, breaking the break section 1308, moving the cap 1304 and thus allowing flow of fluid or gas through either the inlet piece 1204 or the second tube 1206, into the chamber 1210 and out the chamber 1210 through the other tube.

Figure 14:
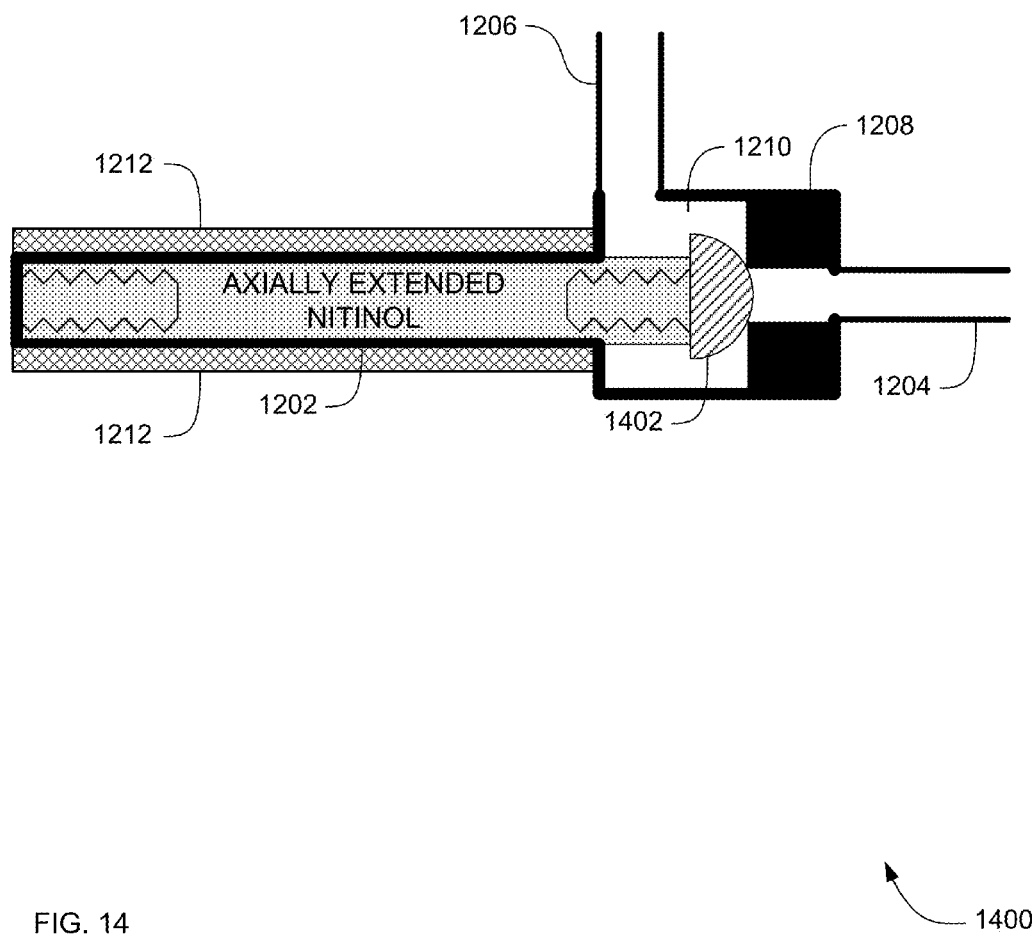
FIG. 14 is a block diagram of a normally-closed valve assembly having a bend in the flow path and having a seat coupled to an axially extended actuator, according to an embodiment.

FIG. 14 is a block diagram of a normally-closed valve assembly 1400 having a bend in the flow path and having a seat coupled to an axially extended actuator, according to an embodiment. The normally-closed valve assembly 1200 includes a Nitinol actuator 1202, or an actuator having another shape-memory metal. The Nitinol actuator 1202 is extended along a longitudinal axis. In some embodiments, the Nitinol is stretched lengthwise.

The normally-closed valve assembly 1200 also includes a hemisphere 1402 that is attached to the Nitinol actuator 1202. This valve does not have a parent metal seal, or a break section, but can achieve pyrovalve-like requirements through large seating forces imparted during manufacture. The normally-closed valve assembly 1200 also includes an inlet piece 1204. The normally-closed valve assembly 1200 also includes a second tube 1206 that is open to a housing 1208 that forms a chamber 1210. The Nitinol actuator 1202 is in thermal contact with a heater 1212, for example, the Nitinol actuator 1202 is surrounded and in direct contact with the heater 1212.

When the Nitinol actuator 1202 is heated by heater 1212 above the transformation temperature of the Nitinol, the actuator 1202 will shrink lengthwise and thereby return to its original shape, moving the hemisphere 1402 away from the inlet piece 1204, and thus allowing flow of fluid or gas through either the inlet piece 1204 or the second tube 1206, into the chamber 1210 and out the chamber 1210 through the other tube. The flow will occur from the tube that has a higher pressure of contents than the other tube.

FIG. 15 is a block diagram of a normally-closed valve assembly 1500 having a bend in the flow path and having a cap coupled to axially compressed actuator, according to an embodiment. The normally-closed valve assembly 1500 includes a Nitinol actuator 1502, or an actuator having another shape-memory metal. The Nitinol actuator 1502 is compressed along a longitudinal axis.

The normally-closed valve assembly 1500 also includes a cap 1304, which creates a parent metal seal. The cap 1304 is attached to the Nitinol actuator 1502. The normally-closed valve assembly 1500 also includes an inlet piece 1306 that is attached to the cap 1304 via a break section 1308. The normally-closed valve assembly 1500 also includes a second tube 1206 that is open to a housing 1504 that forms a chamber 1210. The Nitinol actuator 1502 is in thermal contact with a heater 1212, for example, the Nitinol actuator 1502 is surrounded and in direct contact with a heater.

Some embodiments of the normally-closed valve assembly 1500 also include a guide and/or stop 1506. In some embodiments, the guide/stop 1506 is star-like (e.g., 10° with 10° without 10° with, 10° without—all the way around). In some embodiments, the guide/stop 1506 includes holes to allow flow passage. The purpose of the guide/stop 1506 is to guide and/or stop the broken off cap 1304. The purpose of the guide/stop 1506 in not being continuous or having holes is to allow flow of the liquid or gas through the guide/stop 1506. Alternatively, the outlet tube can be connected to some other part of the chamber. For example, if the outlet tube were connected to the bottom side of the chamber such that its axis is parallel or co-linear to the axis of the inlet tube the valve would not by a 90° bend valve, but rather straight through and the flow would not need to pass by the cap at all, but rather the cap would be held entirely out of the way.

When the Nitinol actuator 1502 is heated above the transformation temperature of the Nitinol, the actuator 1502 will enlarge lengthwise and thereby return to its original shape, breaking the break section 1308, and in embodiments having the guide/stop 1506, moving the cap into contact with the guide/stop 1506, thus allowing flow of fluid or gas through either the inlet piece 1306 or the second tube 1206, into the chamber 1210 and out the chamber 1210 through the other tube. The flow will occur from the tube that has a higher pressure of contents than the other tube.

Figure 16:
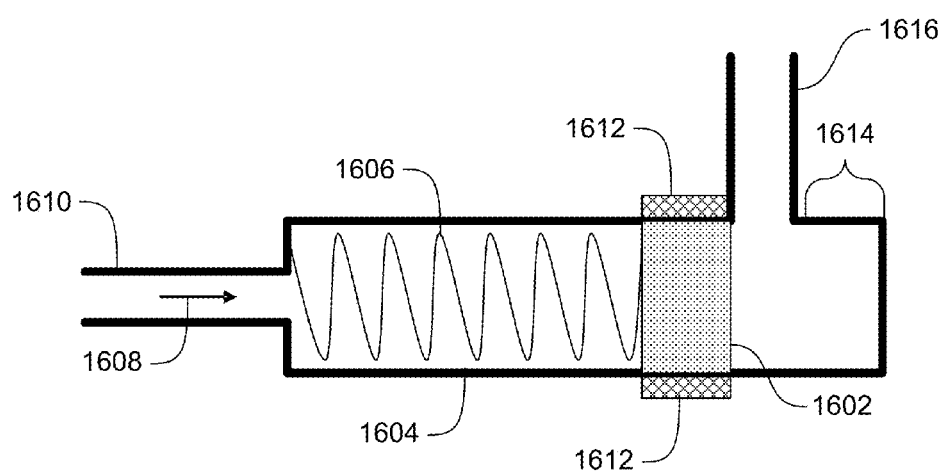
FIG. 16 is a block diagram of a normally-closed valve assembly having a bend in the flow path and having a seal comprising an axially compressed slug actuator, according to an embodiment.

FIG. 16 is a block diagram of a normally-closed valve assembly 1600 having a bend in the flow path and having a seal comprising an axially compressed slug actuator, according to an embodiment. Because the Posson's Ratio of Nitinol is 0.33, axial compression leads to radial expansion, like in most materials. The normally-closed valve assembly 1600 includes a slug actuator 1602 of Nitinol or other shape-memory alloy, that is placed inside a tube 1604, in which the actuator 1602 and the tube 1604 have an interference fit. The slug would be press fit into the chamber 1604 or cooled down to slide the slug into tube 1604, and held by friction. When the 1602 actuator is heated above the transformation temperature of the shape-memory alloy, the slug would expand axially but shrink radially thereby allowing the slug to slide freely and would be pushed until the slug became lodged or positioned into the stop gap or side chamber 1614 by a compressed spring 1606. A spring 1606 provides a force or pressure on the actuator 1602 in the same direction 1608 that a flow of a fluid or gas provides pressure from an inlet tube 1610 in the tube 1604. The normally-closed valve assembly 1600 also includes a heater 1612 that provides heat energy to the shape-memory alloy in the actuator. In some embodiments, the axial length of the stop-gap 1604 is equal to or less than the axial length of the actuator 1604, so that the actuator 1602 does not protrude outside of the stop-gap 1614. When the actuator 1602 is lodged or positioned in the stop-gap 1614, a path is cleared from the inlet 1610, through the tube 1604 and out through an outlet tube 1616. Like other valves, the 90° bend can be eliminated by having the stop gap be much larger than the slug and have holes in the slug passing through to an outlet tube.

Figure 17:
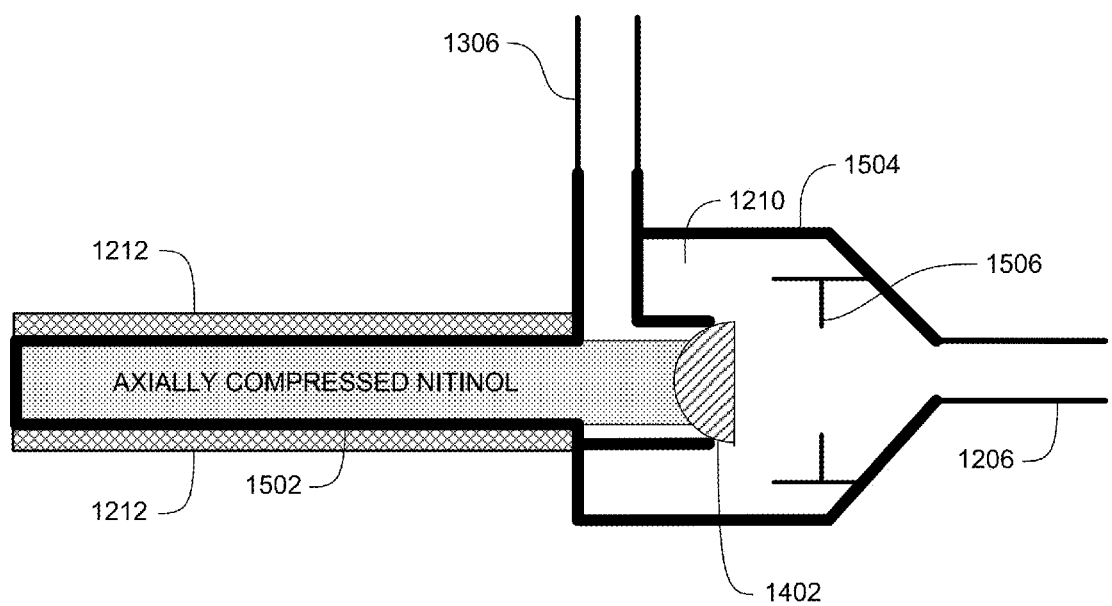
FIG. 17 is a block diagram of a normally-closed valve assembly having a bend in the flow path and having a cap coupled to axially compressed actuator, according to an embodiment.
Figure 17:
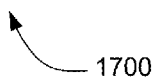

FIG. 17 is a block diagram of a normally-closed valve assembly 1700 having a bend in the flow path and having a cap coupled to axially compressed actuator, according to an embodiment. The normally-closed valve assembly 1700 includes a Nitinol actuator 1502, or an actuator having another shape-memory metal. The Nitinol actuator 1502 is compressed along a longitudinal axis.

The normally-closed valve assembly 1700 also includes a hemisphere 1402 or other cap. The hemisphere 1402 is attached to the Nitinol actuator 1502. The normally-closed valve assembly 1700 also includes an inlet piece 1306. The normally-closed valve assembly 1700 also includes a second tube 1206 that is open to a housing 1504 that forms a chamber 1210. The Nitinol actuator 1502 is in thermal contact with a heater 1212, for example, the Nitinol actuator 1502 is surrounded and in direct contact with the heater 1502.

When the Nitinol actuator 1502 is heated above the transformation temperature of the Nitinol, the actuator 1502 will enlarge lengthwise and thereby return to its original shape, and in embodiments having the guide/stop 1506, moving the hemisphere 1402 into contact with the guide 1506, thus allowing flow of fluid or gas through either the inlet piece 1306 or the second tube 1206, into the chamber 1210 and out the chamber 1210 through the other tube. The flow will occur from the tube that has a higher pressure of contents than the other tube.

METHODS OF AN EMBODIMENT

In the previous section, an apparatus of the operation of an embodiment was described. In this section, the particular processes of such an embodiment are described by reference to a series of flowcharts.

Figure 18:
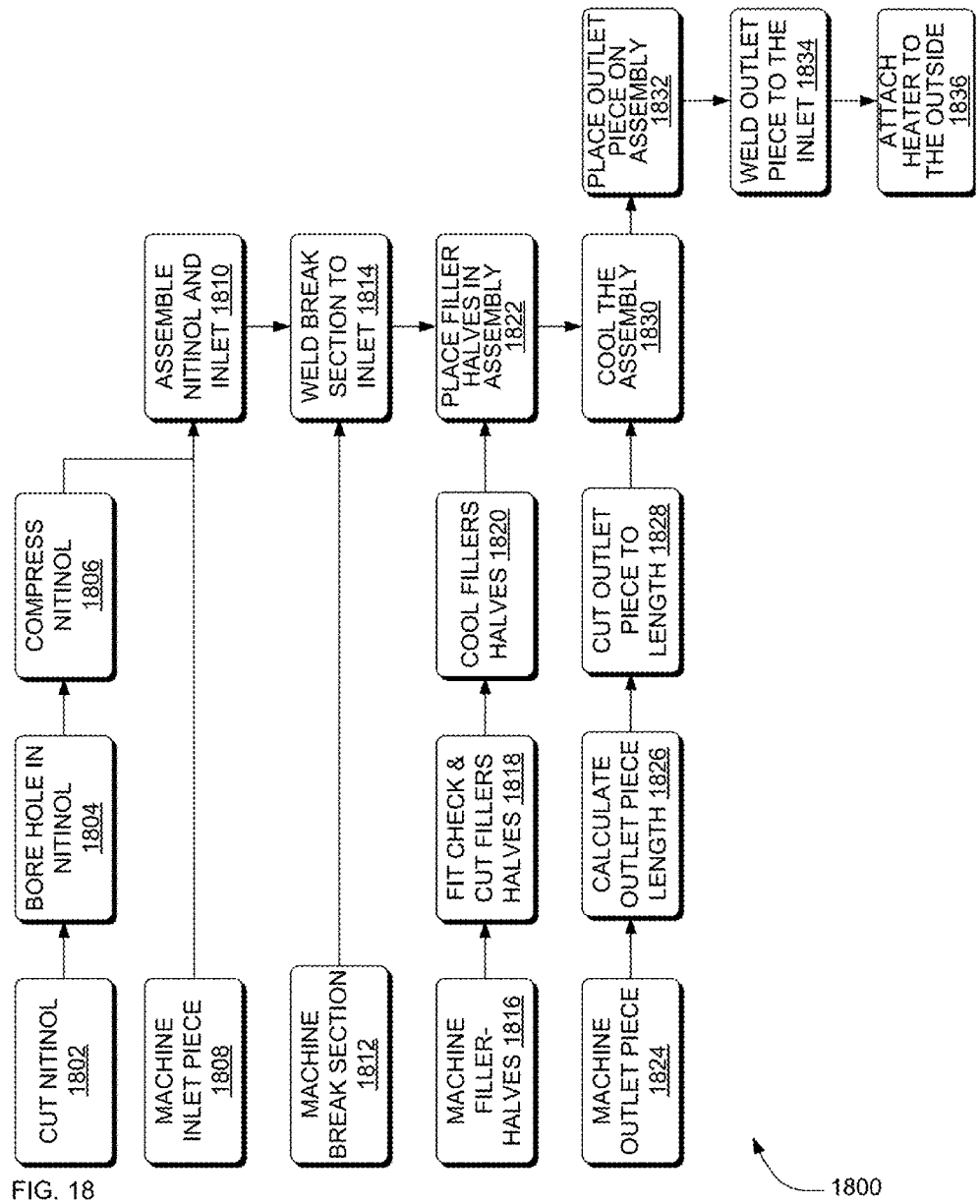
FIG. 18 is a process-flow of a method to fabricate a normally-closed valve assembly having a Nitinol actuator, according to an embodiment.

FIG. 18 is a process-flow of a method 1800 to fabricate a normally-closed valve 500 assembly having a Nitinol actuator, according to an embodiment.

Some embodiments of method 1800 include cutting a piece of Nitinol to shape, at block 1802. One example of the Nitinol is the Nitinol actuator 402 in FIG. 4 above. In some embodiments, block 1802, further includes cutting the Nitinol to length of ½" outer diameter (OD) bar.

Some embodiments of method 1800 include boring a whole in the Nitinol at block 1804. In some examples the whole is ¼" in diameter.

Some embodiments of method 1800 include compressing the Nitinol, at block 1804. In some embodiments, block 1806 includes compressing the Nitinol lengthwise under 173,000 pounds of pressure per square inch to approximately 93% of the uncompressed length, at a temperature of about 70 degrees Fahrenheit. Upon release of the pressure, the Nitinol expands to approximately 95% of the uncompressed length.

Some embodiments of method 1800 include machining an inlet piece, at block 1808. One example of the inlet piece is inlet piece 101 in FIG. 1 above. In some embodiments of the inlet piece is composed of an alloy of titanium Ti 6Al4V.

Some embodiments of method 1800 include assembling the cut Nitinol and the inlet piece, at block 1810. In some embodiments the assembling 1810 includes sliding the Nitinol onto the inlet piece.

Some embodiments of method 1800 include machining a break section, at block 1812. In some embodiments of the break section, the break section is composed of an alloy of titanium Ti 6Al4V.

One example of the break section is the break section 212 of the flow passage piece 106 in FIG. 1, so embodiments of method 1800 include welding the break section to the inlet piece, at block 1814.

Some embodiments of method 1800 include machining the filler(s), at block 1816. In some embodiments of the filler(s), the filler(s) is composed of an alloy of titanium Ti 6Al4V.

Some embodiments of method 1800 include performing a fit check and cutting the filler(s) to exact length, at block 1818, cooling the filler(s), at block 1820, and placing the filler(s) in the assembly, at block 1822. One example of the filler(s) is filler halves 702 and 802 in FIG. 8.

Some embodiments of method 1800 include machining an outlet piece, at block 1824. In some embodiments of the outlet piece, the outlet piece is composed of an alloy of titanium Ti 6Al4V.

Some embodiments of method 1800 also include calculating a length of the outlet piece, at block 1826, and cutting the outlet piece to the length, at block 1828, and cooling the outlet piece. One example of the outlet piece is the second tube 108 in FIG. 1.

Some embodiments of method 1800 also include cooling the entire subassembly, at block 1830, which helps attain a tight fit from the outlet piece to the Nitinol, which is helpful in achieving heat transfer. In some embodiments, the cooling at blocks 1820 and 1830 includes cooling by application of liquid nitrogen, which helps achieve adequate changes in dimension.

Some embodiments of method 1800 also include placing the outlet piece on the assembly, at block 1832, and attaching the outlet piece to the inlet piece, at block 1834. In some embodiments the attaching 1832 includes welding, the outlet piece to the inlet piece.

Some embodiments of method 1800 include attaching a heater to the outside of the assembly, at block 1836. One example of the heater is heater 404 in FIG. 4. In one example of attaching 1836, the heater. The heater is glued to the outside of the assembly using the epoxy encapsulant Stycast® 2651 manufactured by the National Starch and Chemical Company at 742 Grayson Street, Berkeley, Calif. 94710-2677. After application, Stycast 2651 has a hardness value of between 86 and 88 Shore D and a flexural strength of between 10,600 and 15,000 pounds per square inch (PSI).

CONCLUSION

Systems, method and apparatus of a normally-closed valve that implements Nitinol to activate the value in an open state have been described. Although specific embodiments have been illustrated and described herein, it will be appreciated by those of ordinary skill in the art that any arrangement which is calculated to achieve the same purpose can be substituted for the specific embodiments shown. This application is intended to cover any adaptations or variations.

In particular, one of skill in the art will readily appreciate that the names of the methods and apparatus are not intended to limit embodiments. Furthermore, additional methods and apparatus can be added to the components, functions can be rearranged among the components, and new components to correspond to future enhancements and physical devices used in embodiments can be introduced without departing from the scope of embodiments. One of skill in the art will readily recognize that embodiments are applicable to future valves and different valves.

The terminology used in this application with respect to the valve, inlet piece, and outlet piece, actuator and heater is meant to include all environments and alternate technologies which provide the same functionality as described herein.

I claim:

1. A method to fabricate a valve, the method comprising:
   sliding an actuator over a first portion of a metallic inlet piece, the first portion of the metallic inlet piece having an outer proportion that is about equal to an inner proportion of an inside of the actuator, the longitudinal length of the actuator being less than the longitudinal length of the first portion of the metallic inlet piece to the extent that an end of the first portion of the metallic inlet piece extends beyond the actuator, the actuator comprising a shape-memory metal; and
   attaching a flow passage piece to the end of the first portion of the metallic inlet piece.

2. The method of claim 1, wherein the attaching further comprises orbital welding.

3. The method of claim 1, wherein the shape-memory metal further comprises a nickel-titanium alloy.

4. The method of claim 3, further comprising:
   attaching at least one filler to the metallic inlet piece in a space proximally between an end of the actuator, and the attaching being performed to a portion of the flow passage piece that is wider than the outer proportion of the metallic inlet piece.

5. The method of claim 4, wherein the at least one filler further comprises two Titanium filler halves, wherein the flow passage piece further comprises a metallic flow passage piece and wherein the attaching of the two Titanium filler halves to the metallic inlet piece and the metallic flow passage piece further comprises welding the two Titanium filler halves to the metallic inlet piece and welding the two Titanium filler halves to the metallic flow passage piece.

6. The method of claim 2, further comprising:
   mounting an outlet piece over a second portion of the metallic inlet piece that has a longitudinal length that is greater than the longitudinal length of the first portion of the metallic inlet piece.

\* \* \* \* \*